US011209546B1

(12) United States Patent
Eldada et al.

(10) Patent No.: US 11,209,546 B1
(45) Date of Patent: *Dec. 28, 2021

(54) SOLID STATE OPTICAL PHASED ARRAY LIDAR AND METHOD OF USING SAME

(71) Applicant: Quanergy Systems, Inc., Sunnyvale, CA (US)

(72) Inventors: Louay Eldada, Sunnyvale, CA (US); Tianyue Yu, Sunnyvale, CA (US); Angus Pacala, San Francisco, CA (US)

(73) Assignee: Quanergy Systems, Inc., Sunnyvale, CA (US)

(*) Notice: Subject to any disclaimer, the term of this patent is extended or adjusted under 35 U.S.C. 154(b) by 646 days.

This patent is subject to a terminal disclaimer.

(21) Appl. No.: 16/157,648

(22) Filed: Oct. 11, 2018

Related U.S. Application Data

(63) Continuation of application No. 14/230,013, filed on Mar. 31, 2014, now Pat. No. 1,032,928.

(Continued)

(51) Int. Cl.
| | |
|---|---|
| *G01C 3/08* | (2006.01) |
| *G01S 17/89* | (2020.01) |
| *G01S 7/481* | (2006.01) |

(52) U.S. Cl.
CPC ............ *G01S 17/89* (2013.01); *G01S 7/4814* (2013.01)

(58) Field of Classification Search
CPC ............................... G01S 17/89; G01S 7/4814
See application file for complete search history.

(56) References Cited

U.S. PATENT DOCUMENTS

| | | |
|---|---|---|
| 5,132,843 A | 7/1992 | Aoyama et al. |
| 5,455,669 A | 10/1995 | Wetteborn |

(Continued)

OTHER PUBLICATIONS

Guo et al., "InP Photonic Integrated Circuit for 2D Optical Beam Steering", Photonics Conference, Oct. 9-13, 2011, Arlington, VA, IEEE, 2011, 3 pgs.

(Continued)

*Primary Examiner* — Samantha K Nickerson
(74) *Attorney, Agent, or Firm* — Cooley LLP

(57) ABSTRACT

A lidar-based apparatus and method are used for the solid state steering of laser beams using Photonic Integrated Circuits. Integrated optic design and fabrication micro- and nanotechnologies are used for the production of chip-scale optical splitters that distribute an optical signal from a laser essentially uniformly to an array of pixels, said pixels comprising tunable optical delay lines and optical antennas. Said antennas achieve out-of-plane coupling of light.

As the delay lines of said antenna-containing pixels in said array are tuned, each antenna emits light of a specific phase to form a desired far-field radiation pattern through interference of these emissions. Said array serves the function of solid state optical phased array.

By incorporating a large number of antennas, high-resolution far-field patterns can be achieved by an optical phased array, supporting the radiation pattern beam forming and steering needed in solid state lidar, as well as the generation of arbitrary radiation patterns as needed in three-dimensional holography, optical memory, mode matching for optical space-division multiplexing, free space communications, and biomedical sciences. Whereas imaging from an array is conventionally transmitted through the intensity of the pixels, the optical phased array allows imaging through the control of the optical phase of pixels that receive coherent light waves from a single source.

20 Claims, 5 Drawing Sheets

Related U.S. Application Data

(60) Provisional application No. 61/821,656, filed on May 9, 2013.

(56) References Cited

U.S. PATENT DOCUMENTS

| | | | |
|---|---|---|---|
| 5,543,805 | A | 8/1996 | Thaniyavarn |
| 5,682,229 | A | 10/1997 | Wangler |
| 6,891,987 | B2 | 5/2005 | Ionov et al. |
| 7,746,449 | B2 | 6/2010 | Ray et al. |
| 7,969,558 | B2 | 6/2011 | Hall |
| 8,125,367 | B2 | 2/2012 | Ludwig |
| 8,203,115 | B2 | 6/2012 | Hochberg et al. |
| 8,311,374 | B2 | 11/2012 | Hochberg et al. |
| 8,731,247 | B2 | 5/2014 | Pollock |
| 8,836,922 | B1 | 9/2014 | Pennecot et al. |
| 8,988,754 | B2 | 3/2015 | Sun et al. |
| 9,069,080 | B2 | 6/2015 | Stettner et al. |
| 9,104,086 | B1 | 8/2015 | Davids et al. |
| 2006/0091303 | A1 | 5/2006 | Evans |
| 2006/0197936 | A1 | 9/2006 | Libeman et al. |
| 2006/0239688 | A1 | 10/2006 | Hillis et al. |
| 2007/0052947 | A1 | 3/2007 | Ludwig et al. |
| 2008/0094607 | A1 | 4/2008 | Bernard et al. |
| 2008/0186470 | A1 | 8/2008 | Hipp |
| 2008/0204699 | A1 | 8/2008 | Benz et al. |
| 2008/0227292 | A1 | 9/2008 | Miki |
| 2009/0059201 | A1 | 3/2009 | Willner et al. |
| 2009/0251680 | A1 | 10/2009 | Farsaie |
| 2009/0278030 | A1 | 11/2009 | Deliwala |
| 2010/0045964 | A1 | 2/2010 | Jin et al. |
| 2010/0187402 | A1 | 7/2010 | Hochberg et al. |
| 2010/0187442 | A1 | 7/2010 | Hochberg et al. |
| 2010/0202734 | A1 | 8/2010 | DeCorby |
| 2010/0253585 | A1 | 10/2010 | Llorens del Rio et al. |
| 2010/0271614 | A1 | 10/2010 | Albuquerque et al. |
| 2010/0290029 | A1 | 11/2010 | Hata |
| 2011/0216304 | A1 | 9/2011 | Hall |
| 2011/0222814 | A1 | 9/2011 | Krill et al. |
| 2011/0255070 | A1 | 10/2011 | Phillips et al. |
| 2011/0316978 | A1 | 12/2011 | Dillon et al. |
| 2012/0013962 | A1 | 1/2012 | Subbaraman et al. |
| 2012/0226118 | A1 | 9/2012 | Delbeke et al. |
| 2012/0286136 | A1 | 11/2012 | Krill et al. |
| 2013/0027715 | A1 | 1/2013 | Imaki et al. |
| 2013/0044309 | A1 | 2/2013 | Dakin et al. |
| 2013/0114924 | A1 | 5/2013 | Loh et al. |
| 2013/0127980 | A1 | 5/2013 | Haddick et al. |
| 2013/0208256 | A1 | 8/2013 | Mamidipudi et al. |
| 2013/0242400 | A1 | 9/2013 | Chen |
| 2013/0301976 | A1 | 11/2013 | Saida et al. |
| 2014/0240691 | A1 | 8/2014 | Mheen |
| 2014/0376001 | A1 | 12/2014 | Swanson |
| 2015/0293224 | A1 | 10/2015 | Eldada et al. |
| 2015/0346340 | A1 | 12/2015 | Yaacobi et al. |
| 2015/0378241 | A1* | 12/2015 | Eldada .............. G01S 7/4817 359/15 |

OTHER PUBLICATIONS

Guo et al., "Two-Dimensional optical Beam Steering with InP-Based Photonic Integrated Circuits", IEEE Journal of Selected Topics in Quantum Electronics, vol. 19, No. 4, Aug. 2013, pp. 1, 6, 8, 11.

Hahne U., Alexa M. (2009). Depth Imaging by Combining Time-of-Flight and On-Demand Stereo. In: Kolb A., Koch R. (eds), Dynamic 3D Imaging. Lecture Notes in Computer Science, vol. 5742. Springer, Berlin, Heidelberg, pp. 70-83.

Hulme et al., "Fully Integrated Hybrid Silicon Free-Space Beam Steering Source with 32 Channel Phased Array", SPIE, Mar. 26, 2014, pp. 898907-2, 898907-13.

International Search Report and Written Opinion issued to international patent application No. PCT/US15/56516, dated Feb. 4, 2016, 7 pgs.

International Search Report and Written Opinion issued to International Patent Application No. PCT/US15/44069, dated Nov. 12, 2015, 9 pgs.

Taillaert et al., "An Out-Of-Plane Grating Coupler for Efficient Butt-Coupling Between Compact Planar Waveguides and Single-Mode Fibers", IEEE Journal of Quantum Electronics, vol. 38, No. 7, Jul. 2002, pp. 951-953.

Van Acoleyen, Karel, "Nanophotonic Beamsteering Elements Using Silicon Technology for Wireless Optical Applications", Ghent University, Dept. of Information Technology, Aug. 27, 2012, 180 pgs.

Van Acoleyen, Karel, "Off-Chip Beam Steering with a One-Dimensional Optical Phased Array on Silicon-On-Insulator", Optics Letters, vol. 34, No. 9, May 1, 2009, pp. 1477-1479.

\* cited by examiner

SOLID STATE OPTICAL PHASED ARRAY LIDAR AND METHOD OF USING SAME

CROSS REFERENCE TO RELATED APPLICATION

This application is a Continuation of U.S. patent application Ser. No. 14/230,013, filed Mar. 31, 2014, which claims the benefit of priority from Provisional Application Ser. No. 61/821,656, filed May 9, 2013, the contents of which are incorporated herein by reference.

PRIORITY CLAIM

The present Application claims the benefit of priority from U.S. Provisional Application Ser. No. 61/821,656, filed May 9, 2013.

REFERENCES CITED

U.S. Patent Documents

U.S. Pat. No. 7,339,727 B1 March 2008 Rothenberg
U.S. Pat. No. 7,406,220 B1 July 2008 Christensen
U.S. Pat. No. 7,428,100 B2 September 2008 Smith
U.S. Pat. No. 7,436,588 B2 October 2008 Rothenberg
U.S. Pat. No. 7,489,870 B2 February 2009 Hillis
U.S. Pat. No. 7,532,311 B2 May 2009 Henderson
U.S. Pat. No. 7,555,217 B2 July 2009 Hillis

FIELD OF THE INVENTION

The present invention relates generally to the field of environment sensing, and more particularly to the use of Time of Flight (ToF) lidar sensors for real-time three-dimensional mapping and object detection, tracking identification and/or classification.

BACKGROUND OF THE INVENTION

A lidar sensor is a light detection and ranging sensor. It is an optical remote sensing module that can measure the distance to a target or objects in a scene, by irradiating the target or scene with light, using pulses (or alternatively a modulated signal) from a laser, and measuring the time it takes photons to travel to said target or landscape and return after reflection to a receiver in the lidar module. The reflected pulses (or modulated signals) are detected, with the time of flight and the intensity of the pulses (or modulated signals) being measures of the distance and the reflectivity of the sensed object, respectively.

Conventional lidar sensors utilize mechanically moving parts for scanning laser beams. In some systems, including certain systems used in automotive applications, such as advanced driver assist systems (ACAS) and autonomous driving systems, it is preferred to use solid state sensors for a variety of potential advantages including but not limited to higher sensor reliability, longer sensor lifetime, smaller sensor size, lower sensor weight, and lower sensor cost.

Radio frequency (RF) delay lines used for the creation of radar phased arrays were used several decades ago for the solid state steering of radar signals. Photonic integrated circuit (PIC) based delay lines combined with detectors and RF antenna arrays were used two decades ago to improve the precision of delays in the solid state steering of radar signals. PICs with microscale and nanoscale devices can be used to produce optical phased arrays (OPAs), comprising tunable optical delay lines and optical antennas, for the solid state steering of laser beams. Phased Arrays in the optical domain that are produced to date are complex, costly and/or have a different purpose than beam forming and beam steering: some combine spatial filters, optical amplifiers and ring lasers (U.S. Pat. No. 7,339,727), some involve a plurality of optical input beams (U.S. Pat. No. 7,406,220), some involve volume diffraction gratings and a plurality of input directions (U.S. Pat. No. 7,428,100), some combine beams of a plurality of wavelengths (U.S. Pat. No. 7,436,588), some have optical phase reference sources and gain elements (U.S. Pat. No. 7,489,870), some have predetermined areas in the field of view and a plurality of beam forming elements (U.S. Pat. No. 7,532,311), and some have multiple frequencies and multiple optical phase reference sources (U.S. Pat. No. 7,555,217).

SUMMARY OF THE INVENTION

A lidar-based apparatus and method are used for the solid state steering of laser beams using Photonic Integrated Circuits (PICs). Integrated optic design and fabrication micro- and nanotechnologies are used for the production of chip-scale optical splitters that distribute an optical signal from a laser essentially uniformly to an array of pixels, said pixels comprising tunable optical delay lines and optical antennas. Said antennas achieve out-of-plane coupling of light.

As the delay lines of said antenna-containing pixels in said array are tuned, each antenna emits light of a specific phase to form a desired far-field radiation pattern through interference of these emissions. Said array serves the function of solid state optical phased array (OPA).

By incorporating a large number of antennas, high-resolution far-field patterns can be achieved by an OPA, supporting the radiation pattern beam forming and steering needed in solid state lidar, as well as the generation of arbitrary radiation patterns as needed in three-dimensional holography, optical memory, mode matching for optical space-division multiplexing, free space communications, and biomedical sciences. Whereas imaging from an array is conventionally transmitted through the intensity of the pixels, the OPA allows imaging through the control of the optical phase of pixels that receive coherent light waves from a single source.

DESCRIPTION OF THE DRAWINGS

The following drawings are illustrative of embodiments of the present invention and are not intended to limit the invention as encompassed by the claims forming part of the application.

The schematic diagram of FIG. 1 provides a frontal view of a solid state lidar sensor 10 that can be implemented using the present invention, depicting an OPA-comprising transmistter 20, a receiver 30, a processor 40 and one or a plurality of printed circuit boards 50 comprising control electronics.

Figure 1:
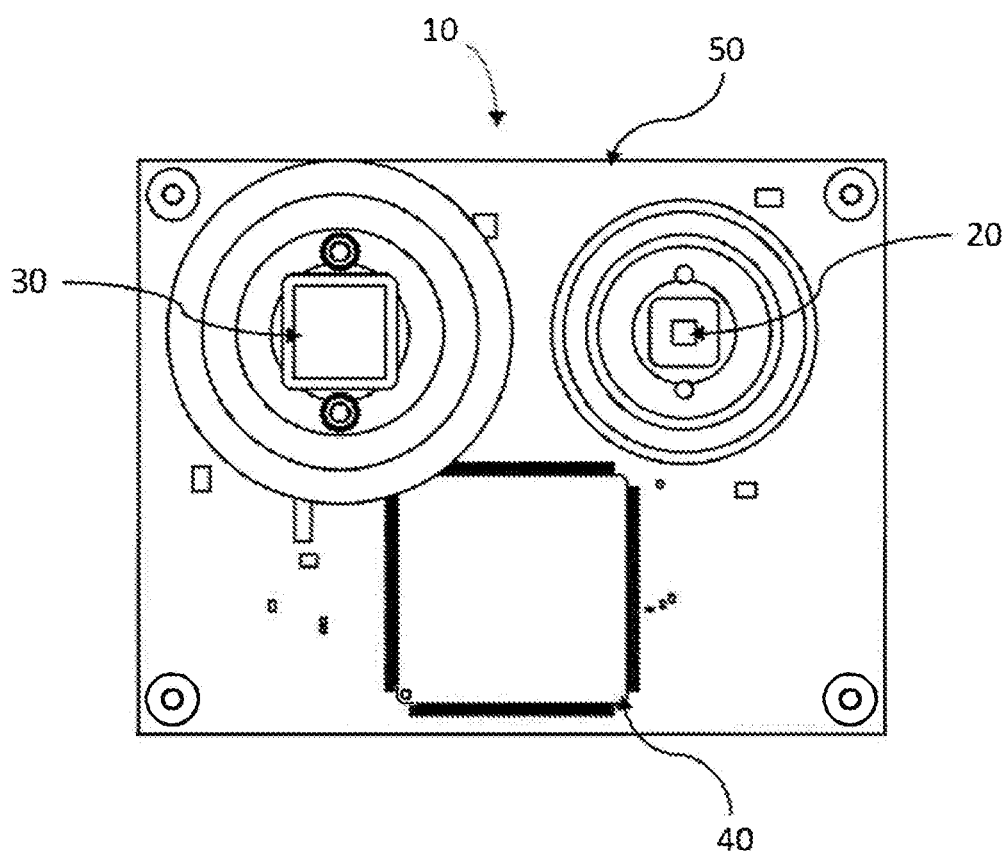
Figure 2:
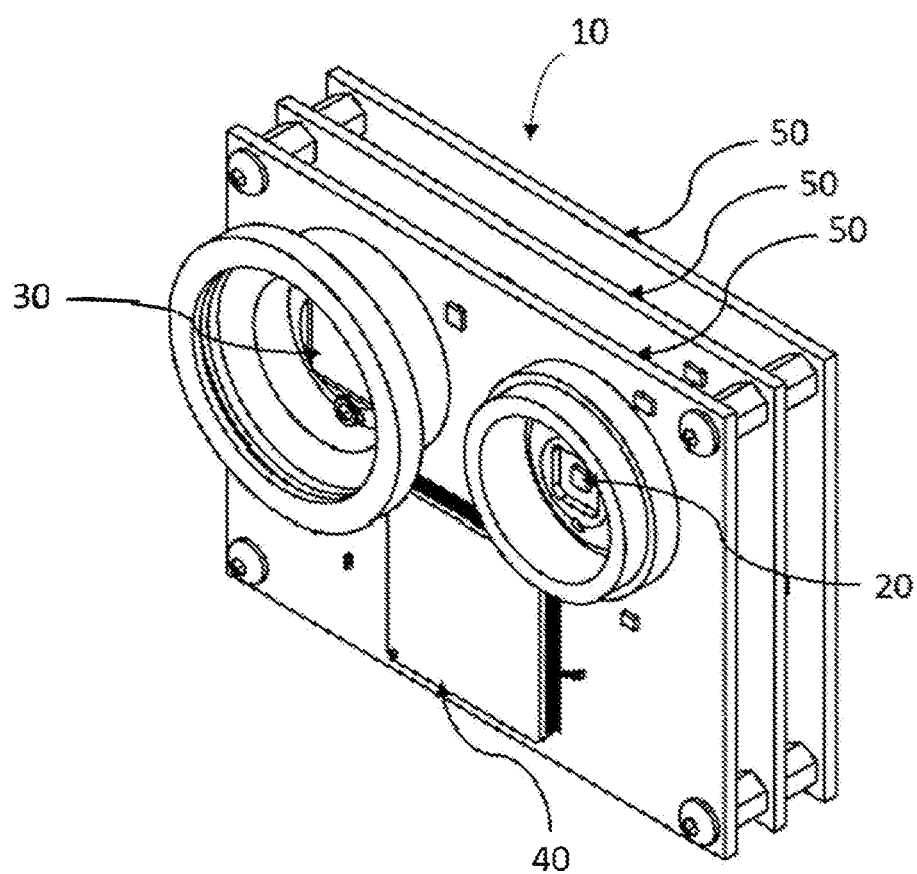

The schematic diagram of FIG. 2 provides an angled view of a solid state lidar sensor 10 that can be implemented using the present invention, depicting an OPA-comprising transmistter 20, a receiver 30, a processor 40 and one or a plurality of printed circuit boards 50 including control electronics.

Figure 3:
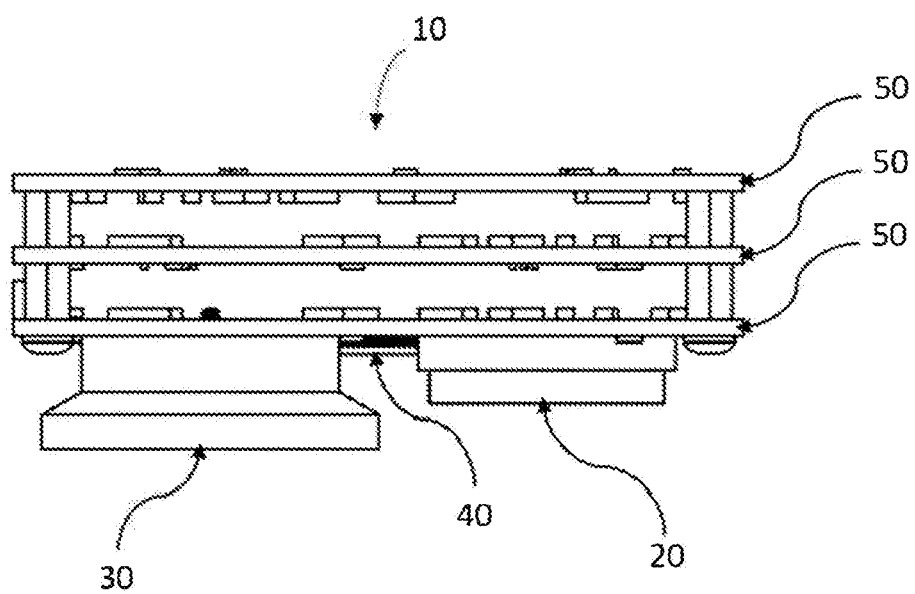

The schematic diagram of FIG. 3 provides a top view of a solid state lidar sensor 10 that can be implemented using the present invention, depicting an OPA-comprising transmistter 20, a receiver 30, a processor 40 and one or a plurality of printed circuit boards 50 including control electronics.

Figure 4:
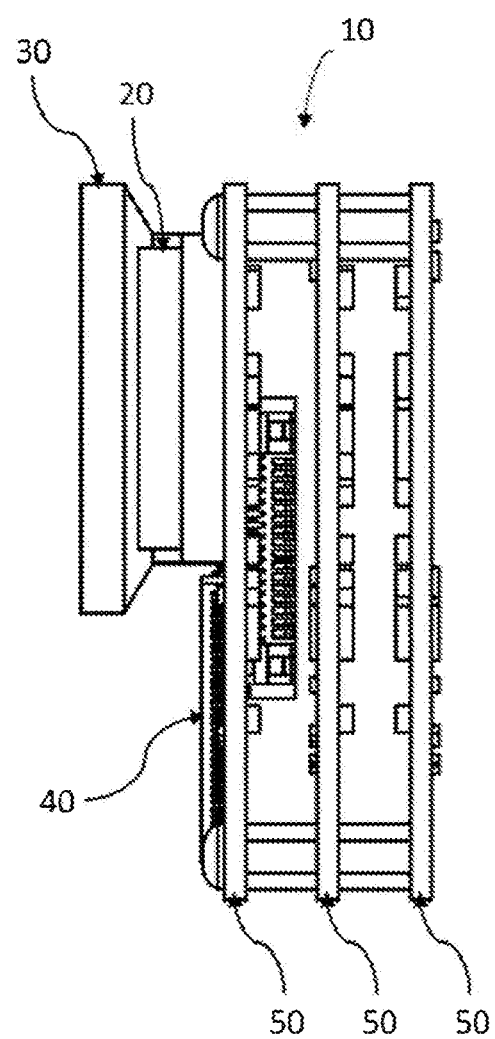

The schematic diagram of FIG. 4 provides a side view of a solid state lidar sensor 10 that can be implemented using the present invention, depicting an OPA-comprising transmistter 20, a receiver 30, a processor 40 and one or a plurality of printed circuit boards 50 including control electronics.

Figure 5A:
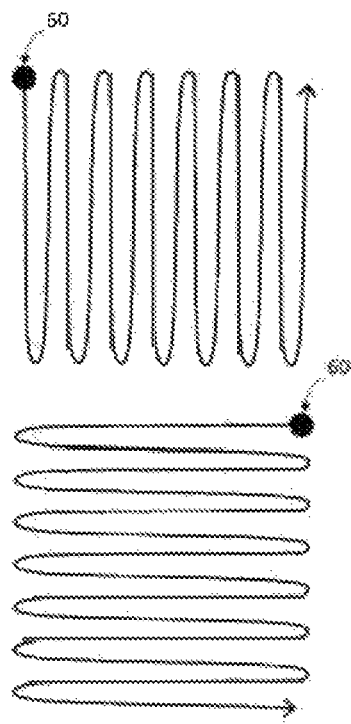
Figure 5B:
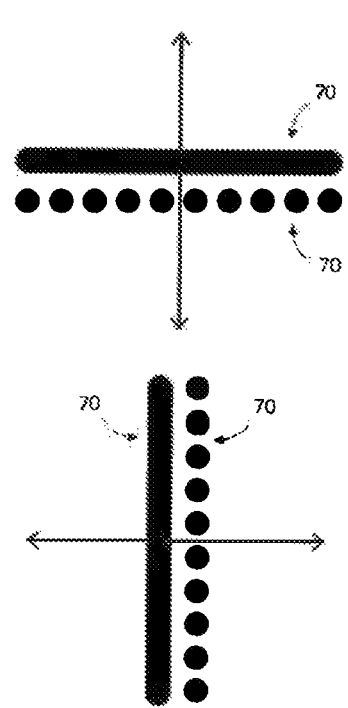
Figure 5C:
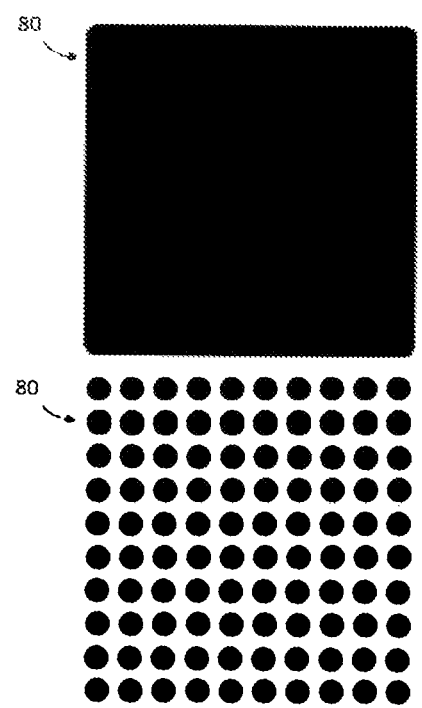

The schematic diagrams of FIG. 5 (*a*) depict a far field radiation pattern that is a spot 60 which is small relative to the scene being mapped; the serpentine arrows represent examples of scanning patterns that result in coverage of the scene being mapped in three dimensions. The schematic diagrams of FIG. 5 (*b*) depict far field radiation patterns 70 whose envelopes are elongated, providing one-dimensional coverage, and the arrows represent examples of scanning directions that result in coverage of the scene being mapped in three dimensions. The schematic diagrams of FIG. 5 (*c*) depict far field radiation patterns 80 whose envelopes essentially cover the scene being mapped (e.g., a two-dimensional array of spots, a square, a rectangle, a disc, an ellipse), and can be combined with ToF distance measurements to produce three-dimensional maps; for this radiation pattern, on the receiving end of a lidar apparatus, a two-dimensional array of receivers can be used to collect the ToF data that correspond to depth.

DETAILED DESCRIPTION OF THE INVENTION

A lidar-based apparatus and method are used for the solid state steering of laser beams using Photonic Integrated Circuits (PICs). Integrated optic design and fabrication micro- and nanotechnologies are used for the production of chip-scale optical splitters that distribute an optical signal from a laser essentially uniformly to an array of pixels, said pixels comprising tunable optical delay lines and optical antennas. Said antennas achieve out-of-plane coupling of light.

As the delay lines of said antenna-containing pixels in said array are tuned, each antenna emits light of a specific phase to form a desired far-field radiation pattern through interference of these emissions. Said array serves the function of solid state optical phased array (OPA).

By incorporating a large number of antennas, high-resolution far-field patterns can be achieved by an OPA, supporting the radiation pattern beam forming and steering needed in solid state lidar, as well as the generation of arbitrary radiation patterns as needed in three-dimensional holography, optical memory, mode matching for optical space-division multiplexing, free space communications, and biomedical sciences. Whereas imaging from an array is conventionally transmitted through the intensity of the pixels, the OPA allows imaging through the control of the optical phase of pixels that receive coherent light waves from a single source.

Said optical splitters can be based on a variety of optical devices, including but not limited to:
Y-branches
Directional couplers
Multimode interference (MMI) couples Said optical splitters can be symmetric 1×N splitters (1 input, N outputs) or asymmetric splitters functioning as power taps.

Said optical splitters can be passive, or they can be tunable for splitting ratio adjustability.

Said delay lines can be based on true time delay, where a physical path length difference is used to generate the delay.

Said delay lines can be tuned based on a variety of methods, including but not limited to:
w Gain elements
All-pass filters
Bragg gratings
Dispersive materials
Wavelength tuning
Phase tuning Wavelength alone can be used to raster a radiation pattern across the far field, resulting in a passive device where phase tuning elements are avoided, typically at the cost of a relatively wide beam in the far field and/or no means of arbitrarily shaping the radiation pattern. Given the typical result obtained with moderate fabrication accuracy, when wavelength tuning is used, it is preferably combined with phase tuning. However when the chip fabrication is done with high accuracy, resulting in a passive device with the desired radiation pattern shape in the far field, and when the application does not require varying the radiation pattern shape, as in lidar applications, steering can be done with wavelength tuning alone, significantly simplifying the device structure and controls.

When phase tuning is used, each pixel can have independent phase control for maximum flexibility and optimal control of the far field radiation pattern, or banding can be used to provide phase tuning to a plurality of pixels with one control signal for the simplification of the design, fabrication, testing, control and operation.

The actuation mechanisms used to tune said delay lines, and said optical splitters when they are tunable, can be any of a variety of mechanisms, including but not limited to:
Thermo-optic actuation
Electro-optic actuation
Electroabsorption actuation
Free carrier absorption actuation
Magneto-optic actuation
Liquid crystal actuation
All-optical actuation The optical antennas can be any of a variety of nanostructures that can couple light out of the plane of the PIC, including but not limited to:
Gratings
Holographic optical elements (HOE)
Mirrors
Total internal reflection (TIR) interfaces
Lenses The out-of-plane coupling elements can also serve as collimators (e.g., HOE), or can be coupled to collimating optical elements.

The chip containing the OPA PIC is preferably compatible with a complementary metal-oxide-semiconductor (CMOS) process, and is preferably based on a silicon on insulator (SOI) structure.

The chip containing the OPA PIC is preferably held at an essentially constant temperature. Methods to hold the chip at an essentially constant temperature include but are not limited to the use of (a) heaters that hold the chip at a design temperature that exceeds the highest specified operating temperature or (b) thermoelectric coolers (TECs) that that hold the chip at any design temperature, even if lower than the highest specified operating temperature. In all chip temperature stabilization schemes, feedback signals from thermistors or resistance temperature detectors (RTDs) are preferably used to close the electrical control loop and maintain the desired temperature.

When an OPA PIC is based on a CMOS process, it can be integrated with control and/or processing electronics that use the same CMOS process.

The OPA PIC can create in the far field a radiation pattern that is spot which is small relative to the scene being mapped, and can scan it horizontally and vertically to produce two-dimensional scans which, combined with ToF distance measurements, produce three-dimensional maps; for this radiation pattern, on the receiving end of a lidar apparatus, a single receiver or a one-dimensional array of receivers or a two-dimensional array of receivers can be used to collect the ToF data that correspond to depth.

The OPA PIC can also create a radiation pattern whose envelope is elongated, to provide one-dimensional coverage, and can scan the pattern essentially perpendicularly to its long dimension to produce two-dimensional scans, and can be combined with ToF distance measurements to produce three-dimensional maps; for this radiation pattern, on the receiving end of a lidar apparatus, one-dimensional array of receivers or a two-dimensional array of receivers can be used to collect the ToF data that correspond to depth.

The OPA PIC can also create a radiation pattern whose envelope essentially covers the scene being mapped (e.g., a two-dimensional array of spots, a square, a rectangle, a disc, an ellipse, a racetrack shape), and can be combined with ToF distance measurements to produce three-dimensional maps; for this radiation pattern, on the receiving end of a lidar apparatus, a two-dimensional array of receivers can be used to collect the ToF data that correspond to depth.

For all OPA-PIC-containing lidar apparatus, multiple OPA chips can be used and/or OPA chips can be combined with mechanical motion to increase the field of view.

The invention claimed is:

1. A time-of-flight lidar ranging apparatus comprising: a) at least one chip comprising at least one optical splitter, a plurality of optical delay lines, and a plurality of out-of-plane optical couplers laid out in an optical antenna array configuration; b) at least one optical receiver; c) processing electronics; and d) control electronics, wherein the at least one optical receiver is a one dimensional array of receivers to collect time of flight data corresponding to depth measurements and the processing electronics combines two dimensional scan data originating at the optical antenna array with the time of flight data originating at the optical antenna array to produce a three dimensional map.

2. The apparatus of claim 1 wherein said chip is compatible with a complementary metal-oxide-semiconductor process.

3. The apparatus of claim 1 wherein said chip is based on a silicon on insulator structure.

4. The apparatus of claim 1 wherein said chip is held at constant temperature.

5. The apparatus of claim 1 wherein said at least one optical splitter is a symmetric splitter with one input and a plurality of outputs.

6. The apparatus of claim 1 wherein said at least one optical splitter is an asymmetric splitter functioning as a power tap.

7. The apparatus of claim 1 wherein said at least one optical splitter is a Y-branch.

8. The apparatus of claim 1 wherein said at least one optical splitter is a directional coupler.

9. The apparatus of claim 1 wherein said at least one optical splitter is a multimode interference coupler.

10. The apparatus of claim 1 wherein said at least one optical splitter is tunable.

11. The apparatus of claim 1 wherein at least a subset of said plurality of optical delay lines are gain elements.

12. The apparatus of claim 1 wherein at least a subset of said plurality of optical delay lines are all-pass filters.

13. The apparatus of claim 1 wherein at least a subset of said plurality of optical delay lines are Bragg gratings.

14. The apparatus of claim 1 wherein at least a subset of said plurality of optical delay lines are dispersive materials.

15. The apparatus of claim 1 wherein at least a subset of said plurality of optical delay lines are wavelength tuned.

16. The apparatus of claim 1 wherein at least a subset of said plurality of optical delay lines are phase tuned.

17. The apparatus of claim 1 wherein said lidar ranging apparatus chip creates a far field radiation pattern approximating a spot.

18. The apparatus of claim 17 wherein said far field radiation pattern is scanned to produce two-dimensional scans.

19. The apparatus of claim 1 wherein said lidar ranging apparatus chip creates a far field elongated envelope radiation pattern.

20. The apparatus of claim 19 wherein said elongated envelope radiation pattern is scanned perpendicularly to a long dimension to produce two-dimensional scans.

* * * * *